United States Patent [19]
Gray

[11] Patent Number: 5,992,877
[45] Date of Patent: Nov. 30, 1999

[54] WINDOW MOUNTED AIR BAG

[75] Inventor: John D. Gray, Union, N.H.

[73] Assignee: Textron Automotive Company, Inc.

[21] Appl. No.: 09/070,460

[22] Filed: Apr. 30, 1998

[51] Int. Cl.[6] .............................. B60R 21/08; B60R 21/22
[52] U.S. Cl. ................................... 280/730.1; 280/743.1; 280/749; 280/752
[58] Field of Search .............................. 280/730.1, 728.1, 280/743.1, 732, 748, 749, 730.2, 751, 752

[56] References Cited

U.S. PATENT DOCUMENTS

| | | |
|---|---|---|
| 1,555,474 | 9/1925 | Walker . |
| 2,757,040 | 7/1956 | McLelland . |
| 2,806,737 | 9/1957 | Maxwell . |
| 3,801,126 | 4/1974 | Knight, IV et al. . |
| 4,130,298 | 12/1978 | Shaunnessey . |
| 4,169,613 | 10/1979 | Barnett . |
| 4,171,140 | 10/1979 | Toshihisa . |
| 4,828,287 | 5/1989 | Siler ......................................... 280/751 |
| 4,832,287 | 5/1989 | Werjefelt . |
| 4,919,483 | 4/1990 | Horkey ..................................... 297/395 |
| 5,112,081 | 5/1992 | Kesseru . |
| 5,232,244 | 8/1993 | Itoh ........................................... 280/749 |
| 5,599,042 | 2/1997 | Shyr et al. ............................. 280/730.1 |
| 5,707,075 | 1/1998 | Kraft et al. ............................ 280/730.2 |

*Primary Examiner*—Paul N. Dickson
*Attorney, Agent, or Firm*—Reising, Ethington, Barnes, Kisselle, Learman & McCulloch, P.C.

[57] ABSTRACT

An air bag occupant restraint system (10) for a vehicle comprises an inflatable cushion (14) adapted to inflate in the event of a vehicle collision. A gas generating device (16) in communication with the cushion (14) inflates the cushion. The cushion (14) includes a transparent portion (18) disposed on at least a portion of the interior of the windshield (12) when in the collapsed state. With this arrangement, the transparent portion (18) can inflate to inhibit the occupant from colliding with the windshield (12) and other objects adjacent to the windshield in the event of a collision. Similarly, the inventive method for cushioning a vehicle occupant in the event of collision comprises the following steps. First, dispose an inflatable cushion (14) over the windshield (12) of the vehicle when the cushion is in an uninflated state. Next, communicate the cushion (14) with a gas generating device (16) adapted to inflate the cushion in the event of a collision. Then, sense when a collision occurs. If a collision occurs, inflate the cushion (14) with gas.

9 Claims, 5 Drawing Sheets

5,992,877

WINDOW MOUNTED AIR BAG

TECHNICAL FIELD

The invention relates to a safety device in the form of an air bag apparatus for motor vehicle occupants and its method for use. The apparatus is of the type including an air bag and a gas generating device for filling the air bag in the event of a vehicle collision.

BACKGROUND OF THE INVENTION

The air bag art has developed extensively over the past several decades with advances in numerous areas, including bag packaging within the vehicle and bag deployment systems. Also, the art has seen advances in bag design, bag venting, and bag inflating devices. In a typical case, an airbag is packaged behind a steering wheel cover or behind the trim on the passenger side of the instrument panel. In the event of a collision, the bag deploys through the steering wheel cover or through the trim panel to cushion an occupant—either the driver or the passenger. In the event of a minor collision where the vehicle is repairable, one faces substantial expense in replacing not only the air bags that have deployed, but also any instrument panels that have been destroyed by air bag deployment.

SUMMARY OF THE INVENTION AND ADVANTAGES

In the present invention, an occupant restraint system for a vehicle comprises a vehicle window adapted to be installed in a vehicle, where the window has an interior surface facing the interior of the vehicle when installed. An inflatable cushion is adapted to inflate under predetermined conditions from a collapsed, uninflated state to an inflated, balloon-like state to cushion a vehicle occupant in the event of a vehicle collision. A gas generating device in communication with the cushion is adapted to inflate the cushion with gas under predetermined conditions to the inflated state. The cushion includes a transparent portion disposed on at least a portion of the interior surface of the vehicle window when in the collapsed state. With this arrangement, the transparent portion can inflate to inhibit the occupant from colliding with the window and other objects adjacent to the window in the event of a collision.

Similarly, the inventive method for cushioning a vehicle occupant in the event of a vehicle collision comprises the following steps. First, dispose an inflatable cushion over a window of the vehicle when the cushion is in an uninflated state. Next, communicate the cushion with a gas generating device adapted to inflate the cushion in the event of a collision. Then, sense when a collision occurs. If a collision occurs, then inflate the cushion with gas.

The present invention holds certain advantages over prior art air bags—mainly because it involves less expense in installation and replacement. First of all, the air bag can be applied to the windshield itself, with some additional components easily installed nearby. The air bag assembly does not need to be installed behind an instrument panel or a steering wheel. This can be time consuming and costly—especially in the case of replacement. Also, the air bag itself will not damage the vehicle during deployment. In the typical case the air bag deploys through the instrument panel or steering wheel, destroying the instrument panel or steering wheel cover in the process. With the present invention, only the windshield may need replacement once the air bag deploys; but the vehicle windshield usually breaks during a collision anyway, and needs replacing. Lastly, if the air bag is transparent, the driver can see through the air bag even when it is deployed, possibly enhancing the driver's ability to avoid subsequent collisions.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1A:
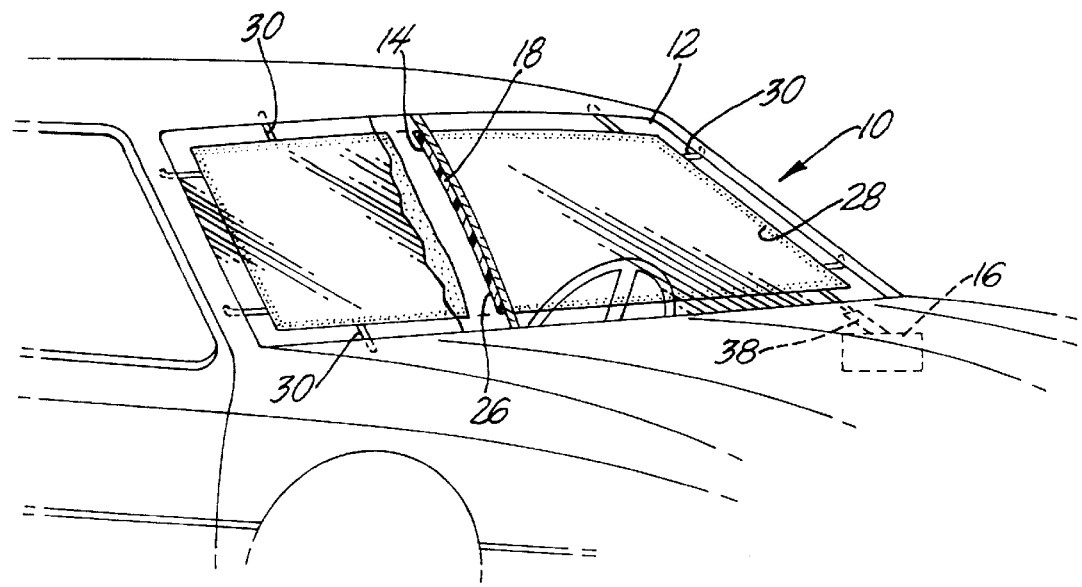
FIG. 1A is a perspective view of the front of a vehicle with the windshield partially cut away to show a first embodiment of the invention.
Figure 1B:
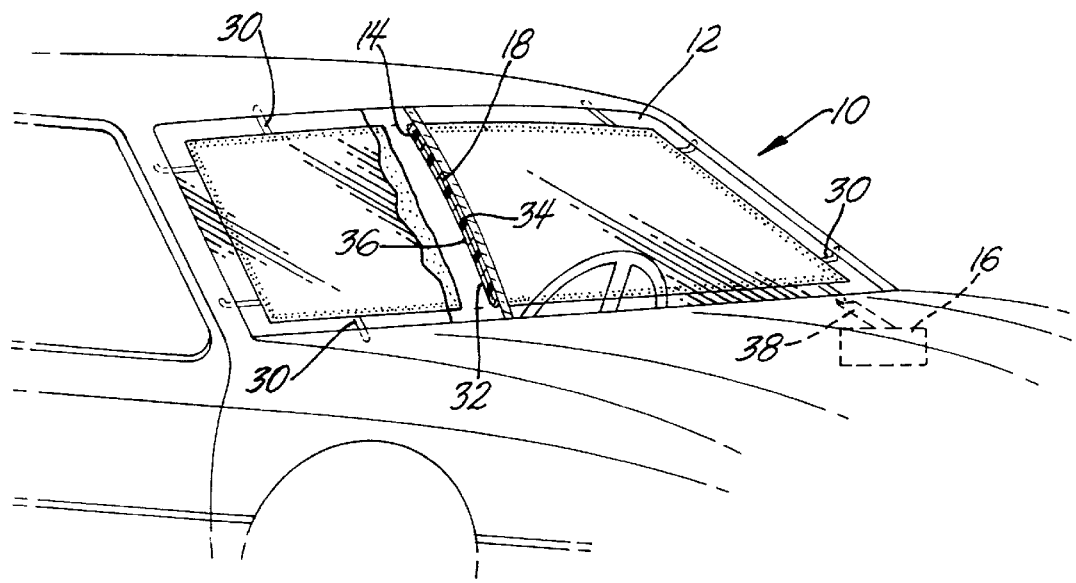
FIG. 1B is a similar perspective view of the front of a vehicle with the windshield partially cut away to show a second embodiment of the invention.
Figure 2:
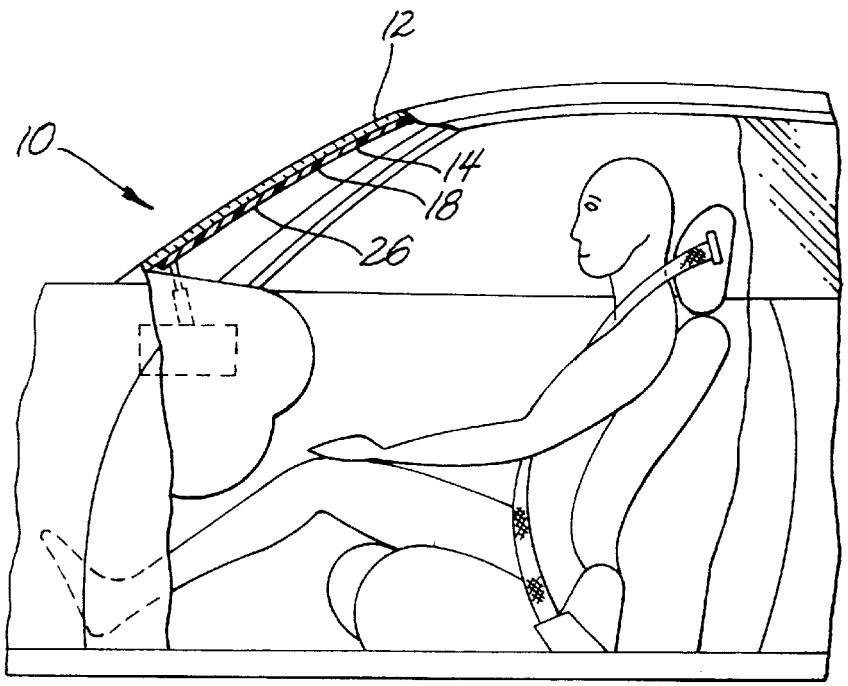
FIG. 2 is a side sectional view of the vehicle showing the first embodiment of the invention.
Figure 3:
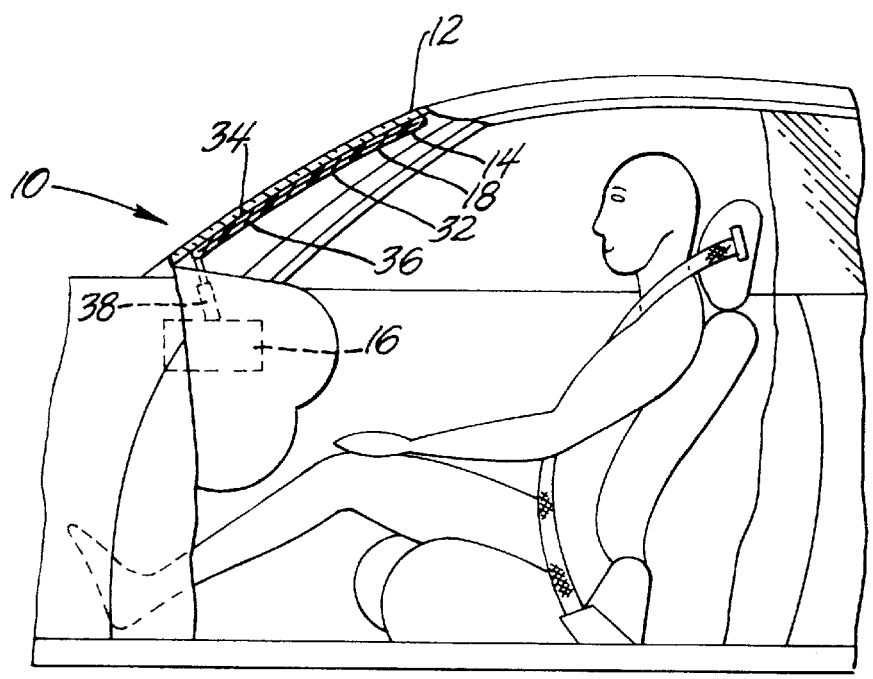
FIG. 3 is a similar side sectional view of the vehicle showing the second embodiment of the invention.
Figure 4:
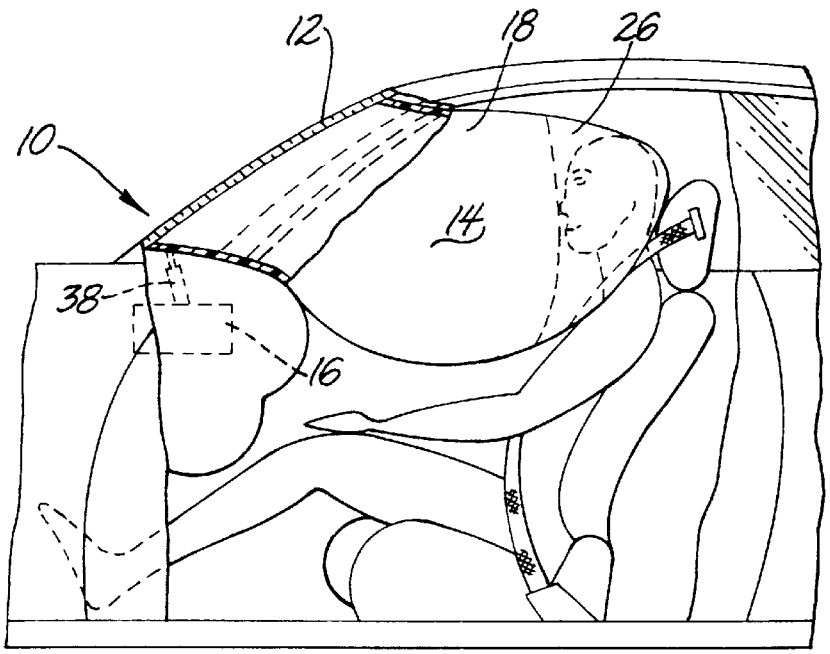
FIG. 4 is a side sectional view of the vehicle showing the first embodiment of the invention with the cushion in the inflated state, where the cushion is partially cut away.
Figure 5:
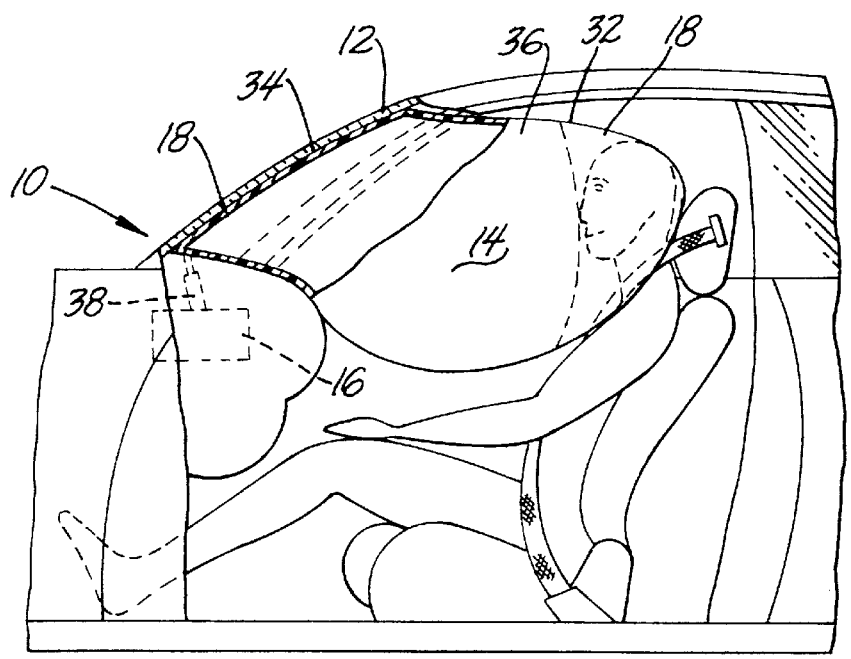
FIG. 5 is a side sectional view of the vehicle showing the second embodiment of the invention with the cushion in the inflated state, where the cushion is partially cut away.

Referring to the Figures wherein like numerals indicate like or corresponding parts throughout the several views, a window mounted air bag assembly is generally shown at 10.

The system generally includes a vehicle window 12 adapted to be installed in a vehicle, where the window has an interior surface facing the interior of the vehicle when installed. The system also includes an inflatable cushion 14 adapted to inflate under predetermined conditions from a collapsed, uninflated state to an inflated, balloon-like state to cushion a vehicle occupant in the event of a vehicle collision. Next, the system has a gas generating device 16 in communication with the cushion 14 and adapted to inflate the cushion with gas under predetermined conditions to the inflated state. Finally, the cushion 14 includes a transparent portion 18 disposed on at least a portion of the interior surface of the vehicle window 12 when in the collapsed state. In this manner, the transparent portion 18 can inflate to inhibit the occupant from colliding with the window 12 and other objects adjacent to the window in the event of a collision.

While the system can be associated with any window in the vehicle, the preferred case involves the windshield 12. The cushion 14 can be applied to the windshield 12 as shown in the figures. The cushion 14 can extend across the entire windshield 12 to protect all front seat occupants, or it can extend over just a portion of the windshield to protect fewer of the occupants. Further, the system can include two or more separate cushions applied to the windshield to selectively protect one or more occupants from various injuries.

The material for the cushion 14 can be any suitable material known to persons skilled in the art. Examples of transparent plastics include polycarbonate, acrylic, polyethylene, polypropylene, polyvinyl chloride, polystyrene and polyurethane. In this case, "transparent" means that the material is clear enough to permit objects to be viewed with no or low distortion in their appearance.

Figure 6:
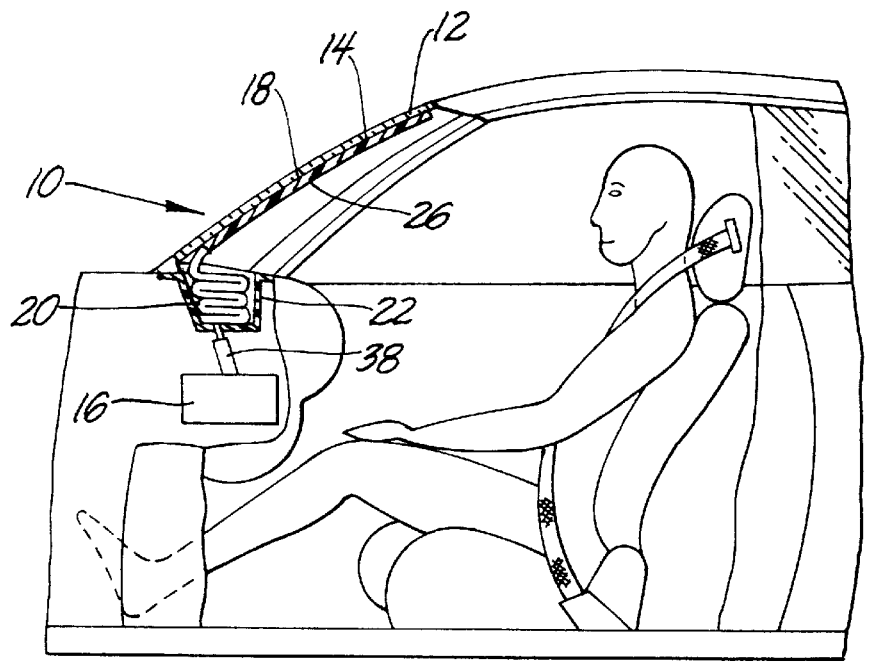
FIG. 6 is a side sectional view of the vehicle showing the first embodiment of the invention in the uninflated state together with a reservoir holding additional cushion material, where the reservoir is located beneath the windshield.
Figure 7:
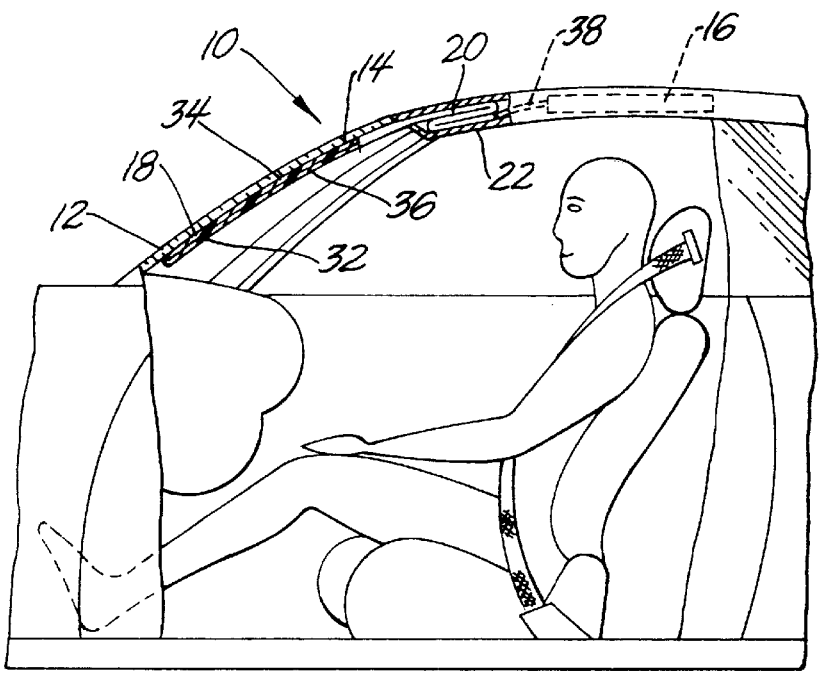
FIG. 7 is a side sectional view of the vehicle showing the second embodiment of the invention in the uninflated state together with a reservoir holding additional cushion material, where the reservoir is located above the windshield.
Figure 8:
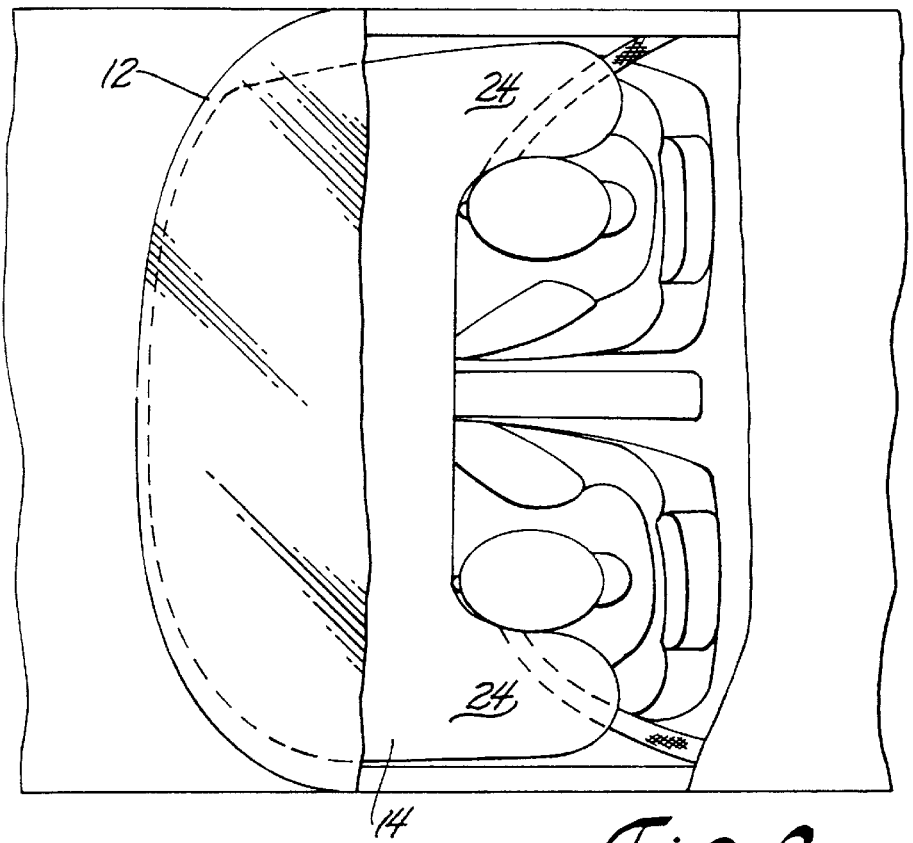
FIG. 8 is a top view of the vehicle with the vehicle roof cut away showing a third embodiment of the invention in the inflated state.

As shown in FIGS. 6 and 7, the cushion 14 may include an expansion portion 20 integral with the transparent portion 18 disposed adjacent the window 12 in the uninflated state and adapted to inflate together with the transparent portion in the event of a collision. This expansion portion 20 may or may not be transparent. As shown in the figures, it can be stored in a suitable reservoir 22 below the windshield 12, or it can be packaged above the windshield. The expansion portion 20 exists to provide additional volume to the cushion 14 if necessary. For example, if the designer wants the cushion 14 to be larger in certain portions, this can be accommodated by storing excess cushion material as suggested. FIG. 8 shows a cushion that includes side extensions 24 to protect against side impacts. The transparent portion 18 of the cushion alone—i.e. without the expansion portion 20—may not be expandable to meet all possible or desirable design choices.

Several embodiments of the transparent portion 18 of the cushion are possible. For example, as shown in FIGS. 1A, 2, 4 and 6, the transparent portion 18 of the cushion 14 may include a single sheet or layer 26 of material adapted to trap gas from the gas generator 16 between itself and the windshield 12 in the event of a collision. In this case, the sheet 26 is secured to the windshield 12 in some suitable manner so that the windshield and the single layer define the cushion. One possible way to effect this is to strongly secure the sheet 26 at its periphery to the glass of the windshield 12 with some suitable adhesive 28 known to persons skilled in the art. Alternatively, one might use some suitable fastening means other than adhesives. The single layer or sheet 26 may be further secured to the frame around the windshield to support the cushion in place during a collision. The sheet 26 is secured with one or more fasteners 30 which may include straps, ties, tape, other trim members or the like. The sheet is further secured to the window pending a crash with a light duty adhesive. The adhesive will maintain the sheet 26 against the surface of the window 12 in such a way that the sheet is transparent. But the adhesive will fail when the gas generator 16 blows gas between the window 12 and the sheet 26 to allow the cushion 14 to inflate. This adhesive is not as strong as the adhesive 28 used to adhere the periphery of the sheet to the window 12. This adhesive 28 will adhere the periphery of the sheet 26 to the window 12 even in the event of a deployment.

Figure 9:
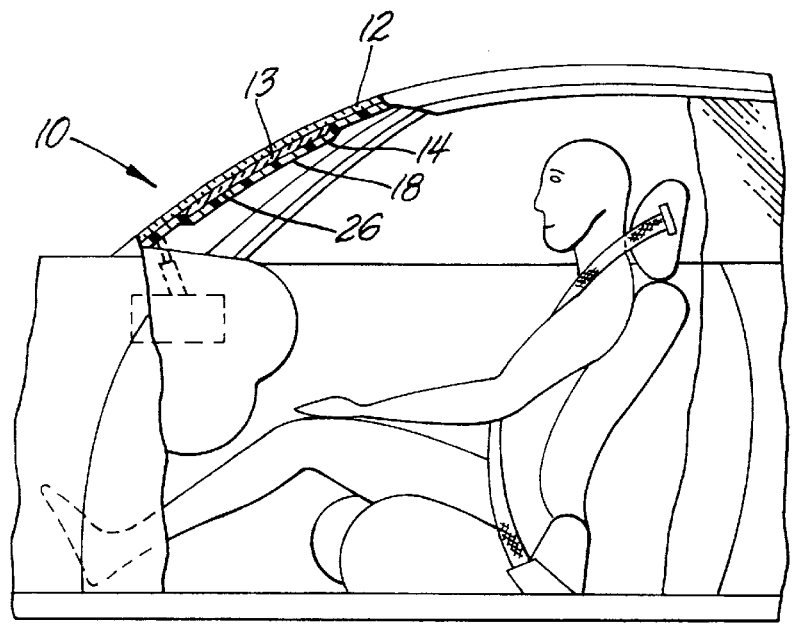
FIG. 9 is a side sectional view of the vehicle similar to that of FIG. 2 showing a variation of the embodiment of FIG. 2.

In a variation on this embodiment, shown in FIG. 9, one places a release sheet 13 between the window 12 and the sheet 26. The release sheet 13, also of transparent material, may be used depending on the material chosen for sheet 26 to facilitate the desired relationship between the window 12 and the sheet 26. According to this relationship, the sheet 26 stays firmly secured to the window—in transparent manner—while in the uninflated state. The sheet 26 releases from the window 12 when in the inflated state.

In another embodiment—shown in FIGS. 1B, 3, 5 and 7—the transparent portion 18 of the cushion 14 is a bladder 32 including two sheets or layers of material attached to one another in a predetermined manner in order to trap gas between themselves in the event of a collision. The bladder 32 includes a first sheet 34 disposed in contact with the windshield 12 when the cushion 14 is in its uninflated state, and a second sheet 36 disposed over the first sheet opposite the windshield 12. In other word s, the first sheet 34 is disposed on the inner surface of the windshield 12, and the second sheet 36 is disposed on the first sheet 34. Preferably, the first and second sheets 34, 36 are joined at their respective peripheries to define the bladder 32, though they may be joined in some other locations to give the bladder varying shapes. The layers can be joined in any suitable manner so that the two layers form a cushion that extends inwardly from the windshield when gas is introduced. In this embodiment, too, the sheets 34, 36 are secured with one or more fasteners 30 to the vehicle around the windshield 12 in order to support the cushion 14 in place in the event of a crash. Light duty adhesives may be used to adhere the sheets 34, 36 together and against the window 12 pending a deployment of the cushion 14.

The gas generating device 16 is typical of what one might find in the art. It is associated with both a collision sensing system (not shown)—also typical of what one might find in the art—and a link or conduit 38 with the present inventive cushion 14. The gas generating device 16 is disposed either below the windshield 12 or above it, selectively, to obtain maximum advantage. FIGS. 6 and 7 depict two possible arrangements.

The system also involves an inventive method corresponding to the inventive apparatus 10 already described. This method—one for cushioning a vehicle occupant in the event of a vehicle collision—comprises several steps.

In the first step, one disposes an inflatable cushion 14 over a window 12 of the vehicle when the cushion is in an uninflated state. This is usually done well before any collision, either during assembly of the vehicle or with retrofitting. The portion 18 of the cushion 14 disposed over the windshield 12 is transparent.

The next step involves communicating the cushion 14 with a gas generating device 16 adapted to inflate the cushion in the event of a collision. Again, this occurs well before the crash—probably during vehicle assembly. One installs a suitable gas generator 16 in the vehicle and communicates it with the cushion 14 so that it will fill the cushion in the event of an impact. Typically, the gas generator 16 will associate with some sensing system well-known in the art for sensing when to activate the gas generator.

In the event of a crash, the sensing system will activate the gas generator 16, which in turn will inflate the cushion 14 to protect the driver or passenger from hitting the windshield 12, steering wheel, instrument panel, door, or other hard surface depending on the design of the cushion.

The invention has been described in an illustrative manner, and it is to be understood that the terminology which has been used is intended to be in the nature of words of description rather than of limitation.

Obviously, many modifications and variations of the present invention are possible in light of the above teachings. Therefore, it is to be understood that within the scope of the appended claims the invention may be practiced otherwise than as specifically described. Moreover, the reference numerals are merely for convenience and are not intended to be in any way limiting.

We claim:

1. An occupant restraint system for a vehicle comprising:

a vehicle window adapted to be installed in a vehicle, said window having an interior surface facing the interior of the vehicle when installed;

an inflatable cushion adapted to inflate under predetermined conditions from a collapsed, uninflated state to an inflated state to cushion a vehicle occupant in the event of a vehicle collision;

a gas generating device in communication with said cushion and adapted to inflate said cushion with gas under predetermined conditions to said inflated state;

said cushion including a transparent portion disposed on at least a portion of said interior surface of said vehicle window when in said collapsed state whereby said transparent portion can inflate to inhibit the occupant from colliding with said window and other objects adjacent to said window in the event of a collision.

2. The restraint system as set forth in claim 1 wherein said cushion includes an expansion portion integral with said transparent portion disposed adjacent said window in said uninflated state and adapted to inflate together with said transparent portion in the event of a collision.

3. The restraint system as set forth in claim 1 wherein said transparent portion of said cushion includes a sheet of material adapted to trap gas from said gas generating device between itself and said window in the event of a collision.

4. The restraint system of claim 3 further including a release sheet disposed between said window and said transparent portion to facilitate releasing of said transparent portion from said window in the event of a collision.

5. The restraint system as set forth in claim 1 wherein said transparent portion of said cushion includes a bladder disposed over said window, said bladder including a first sheet disposed in contact with said window when said cushion is in said uninflated state, and a second sheet disposed over said first sheet opposite said window.

6. The restraint system as set forth in claim 5 wherein said first and second sheets are joined at their respective peripheries.

7. The restraint system as set forth in claim 1 including at least one fastener for fastening said transparent portion to the vehicle in at least one location adjacent said window.

8. The restraint system as set forth in claim 3 wherein said sheet includes a periphery secured to said window at predetermined locations with an adhesive.

9. A method for cushioning a vehicle occupant in the event of a vehicle collision comprising the steps of:

disposing an inflatable cushion in contact with a window of the vehicle when the cushion is in an uninflated state;

communicating the cushion with a gas generating device adapted to inflate the cushion in the event of a collision;

sensing when a collision occurs; and inflating the cushion with gas.

\* \* \* \* \*